Patented Feb. 13, 1945

2,369,509

UNITED STATES PATENT OFFICE 2,369,509

POLYMETHINE COMPOUNDS AND PROCESS FOR PREPARING THEM

Frank L. White, Rochester, N. Y., assignor to Eastman Kodak Company, Rochester, N. Y., a corporation of New Jersey No Drawing. Application December 4, 1940, Serial No. 368,517

9 Claims. (Cl. 260—240)

This invention relates to polymethine compounds and to a process for preparing them.

It is known that certain cyclammonium quaternary salts containing a β-arylaminovinyl group in the alpha or gamma position, i. e., in one of the so-called reactive positions, can be prepared by condensing diarylformamidines with cyclammonium quaternary salts containing a reactive methyl group. If this condensation is carried out in the presence of an anhydride of a monocarboxylic acid, such as acetic anhydride, a N-acyl β-arylaminovinyl compound is formed. It is also known that certain cyclammonium quaternary salts containing an arylamino-1,3-butadienyl group in a reactive position can be prepared by condensing, in the presence of a basic condensing agent, 1-arylamino-3-arylimino propene salts with cyclammonium quaternary salts containing a reactive methyl group. If this condensation is carried out in the presence of an anhydride of a monocarboxylic acid, a N-acyl arylamino-1,3-butadienyl compound is formed. It is further known that certain cyclammonium quaternary salts containing an arylamino-1,3,5-hexatrienyl group in a reactive position can be prepared by condensing, in the presence of a basic condensing agent, 1-arylamino-5-arylimino-1,3-pentadiene salts with cyclammonium quaternary salts containing a reactive methyl group. If this condensation is carried out in the presence of an anhydride of a monocarboxylic acid, a N-acyl arylamino-1,3,5-hexatrienyl compound is formed.

Several of these polymethine compounds, including some of the acylated, have a weak to moderate sensitizing action on photographic silver-halide emulsions.

The above methods of preparation of the polymethine compounds are not especially well adapted to the production of compounds wherein the arylamino portion of the vinyl, the 1,3-butadienyl or the 1,3,5-hexatrienyl group carries substituents, such as halogen, alkyl, alkoxy or dialkylamino, on the aryl nucleus, owing to the unavailability of the necessary starting materials. This is especially true among the 1,3-butadienyl and 1,3,5-hexatrienyl compounds, where such substituted derivatives are unknown.

I have now found a new method for producing β-arylaminovinyl, arylamino-1,3-butadienyl and arylamino-1,3,5-hexatrienyl compounds. Moreover, my new method allows of the ready production of the aforesaid compounds carrying substituents on the aryl nucleus. I have also found that some of the substituted derivatives obtainable by my process are sensitizers of photographic silver-halide emulsions.

It is, accordingly, an object of my invention to provide a new process for preparing polymethine compounds. Another object is to provide new polymethine compounds. A further object is to provide photographic emulsions sensitized with such new compounds. Other objects will become apparent hereinafter.

In accordance with my invention, I react a primary aromatic amine with a cyclammonium quaternary salt containing, in a reactive position, a member selected from the group consisting of N-acyl β-arylaminovinyl groups, N-acyl arylamino-1,3-butadienyl groups and N-acyl arylamino-1,3,5-hexatrienyl groups. Secondary aromatic amines, such as methylaniline, will not undergo a similar reaction.

I have found it advantageous to employ from about 1¼ to about 2 molecular proportions of primary aromatic amine for each molecular proportion of N-acyl arylamino compound. I have also found it advantageous to effect the reactions in the presence of an alcohol, such as an alcohol of the formula $C_nH_{2n+1}OH$ where $n$ represents a positive integer of from one to three. Heat accelerates the reactions.

The following examples will serve to illustrate my new process.

*Example 1—2-(2-anilinovinyl) benzothiazole ethiodide*

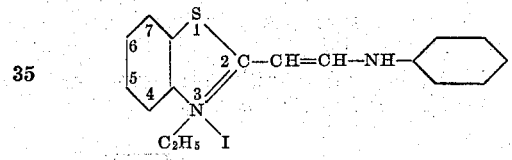

1.12 g. (1 mol.) of 2-(2-acetanilidovinyl) benzothiazole ethiodide and 0.3 g. (1.25 mol.) of aniline were placed in 10 cc. of absolute ethyl alcohol. The mixture was boiled, under reflux, for 20 minutes. The mixture was then cooled and stirred with 200 cc. of diethyl ether. The resulting suspension was chilled for several hours at 0° C. The solid polymethine compound was collected on a filter. It was removed from the filter and stirred with boiling acetone. The resulting suspension was chilled for several hours at 0° C. The polymethine compound was again filtered off and washed with acetone. After two recrystallizations from methyl alcohol, the compound was obtained, in 54% yield, as brownish needles having a blue reflex and melting at 265° to 266° C. with decomposition. The compound sensitized a photographic gelatino-silver-bromiodide emulsion out to about 670 mu with maxima at about 540 mu and about 620 mu.

*Example 2—2-[4-(o-toluino) - 1,3 - butadienyl] benzothiazole ethiodide*

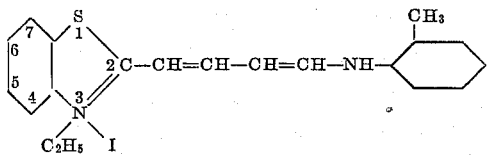

1.2 g. (1 mol.) of 2-(4-acetanilido-1,3-butadienyl) benzothiazole ethiodide and 0.35 g. (1.25 mol.) of o-toluidine were placed in 15 cc. of absolute ethyl alcohol. The mixture was boiled, under reflux, for 30 minutes. The reddish reaction mixture was cooled and stirred with 200 cc. of diethyl ether. The resulting suspension was chilled for 2 hours at 0° C. The polymethine compound was collected on a filter and washed with methyl alcohol. After three recrystallizations of the compound from methyl alcohol (45 cc. per gram of compound), the compound was obtained as dull reddish crystals having a blue reflex and melting at 212° to 214° C., with decomposition. The compound sensitized a photographic gelatino-silver - bromiodide emulsion strongly out to about 610 mu with a maximum at 540 mu.

*Example 3—2-[4-(o-nitroanilino)-1,3-butadienyl]benzothiazole ethiodide*

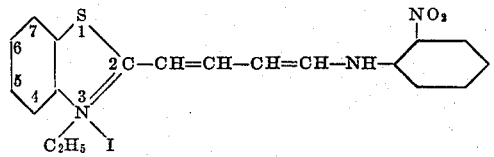

1.2 g. (1 mol.) of 2-(4-acetanilido-1,3-butadienyl) benzothiazole ethiodide and 0.7 g. (2 mol.) of o-nitroaniline were placed in 10 cc. of absolute ethyl alcohol. The resulting mixture was boiled, under reflux, for 5 hours. The reddish reaction mixture was cooled and stirred with 100 cc. of diethyl ether, and the resulting suspension was chilled for 2 hours at 0° C. The polymethine compound was collected on a filter and washed with acetone. After two recrystallizations from 95% ethyl alcohol the compound was obtained in 17% yield as minute dark crystals melting at 251° to 252° C., with decomposition. The compound desensitized a photographic gelatino-silver-bromiodide emulsion.

*Example 4—2-[4-(p-chloroanilino)-1,3-butadienyl]benzothiazole ethiodide*

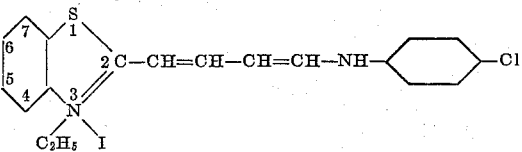

1.2 g. (1 mol.) of 2-(4-acetanilido-1,3-butadienyl)-benzothiazole ethiodide and 0.68 g. (2 mol.) of p-chloroaniline were placed in 10 cc. of absolute ethyl alcohol. The resulting mixture was boiled, under reflux, for 20 minutes. The reaction mixture was then cooled and stirred with 100 cc. of diethyl ether, and the resulting suspension was chilled for 3 hours at 0° C. The polymethine compound was collected on a filter and washed with acetone. After two recrystallizations from methyl alcohol, the compound was obtained in 64% yield as purple crystals melting at 232° to 233° C., with decomposition. The compound sensitized a photographic gelatino-silver-bromiodide emulsion fairly strongly out to about 605 mu with a maximum at about 540 mu.

*Example 5—2-[4-(p-anisidino)-1,3 - butadienyl] benzothiazole ethiodide*

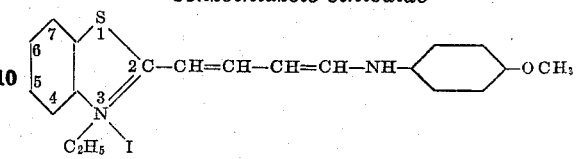

1.2 g. (1 mol.) of 2-(4-acetanilido-1,3-butadienyl) benzothiazole ethiodide and 0.62 g. (2 mol.) of p-anisidine were placed in 10 cc. of absolute ethyl alcohol. The resulting mixture was boiled, under reflux, for 20 minutes. The latter reaction mixture was cooled and stirred with 100 cc. of diethyl ether, and the resulting suspension was chilled for 3 hours at 0° C. The polymethine compound was collected on a filter and washed with acetone. After two recrystallizations from methyl alcohol, the compound was obtained in 52% yield, as minute dark blue needles melting at 214° to 215° C., with decomposition. The compound sensitized a photographic gelatino-silver-bromiodide emulsion fairly strongly to about 625 mu with no well-defined maximum.

*Example 6—2-[4-(β-naphthylamino)-1,3 - butadienyl]benzothiazole ethiodide*

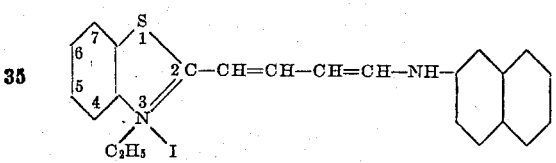

1.2 g. (1 mol.) of 2-(4-acetanilido-1,3-butadienyl)-benzothiazole ethiodide and 0.48 g. (1.25 mol.) of β-naphthylamine were placed in 10 cc. of absolute ethyl alcohol. The mixture was boiled, under reflux, for 20 minutes. The mixture was then cooled and stirred with 200 cc. of diethyl ether. The resulting mixture was chilled for several hours at 0° C. The polymethine compound was filtered off and stirred with boiling acetone. The resulting suspension was chilled for several hours at 0° C. The compound was again collected on a filter and washed with acetone. After two recrystallizations from methyl alcohol, the compound was obtained in 29% yield as dark crystals having a brass colored reflex and melting at 241° to 242° C., with decomposition. The compound sensitized a photographic gelatino-silver-bromiodide emulsion strongly to about 630 mu with an ill-defined maximum at about 560 mu.

*Example 7—2-[4-(o-phenetidino)-1,3-butadienyl]-benzothiazole ethiodide*

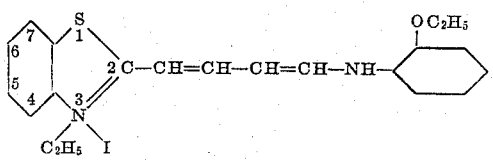

1.2 g. (1 mol.) of 2-(4-acetanilido-1,3-butadienyl)-benzothiazole ethiodide and 0.43 g. (1.25 mol.) of o-phenetidine were mixed together in 15 cc. of absolute ethyl alcohol. The resulting mixture was boiled, under reflux, for 30 minutes. The reaction mixture was cooled and stirred with 200 cc. of diethyl ether. The resulting suspension was chilled for several hours at 0° C. The polymethine compound was then collected on a filter and washed with methyl alcohol. After three recrystallizations from methyl alcohol, the compound was obtained as dark blue crystals melting at 224° to 225° C., with decomposition. The compound sensitized a gelatino-silver-bromiodide emulsion fairly strongly out to about 615 mu with no well-defined maximum.

*Example 8—2-[4-(p-phenylazoanilino)-1,3-butadienyl]-benzothiazole ethiodide*

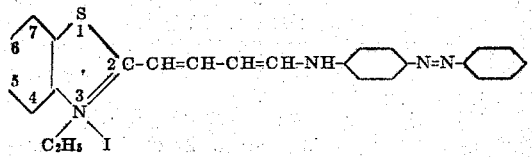

1.2 g. (1 mol.) of 2-(4-acetanilido-1,3-butadienyl)-benzothiazole ethiodide and 0.5 g. (1 mol.) of p-aminoazobenzene were mixed together in 10 cc. of absolute ethyl alcohol. The resulting mixture was boiled, under reflux, for 30 minutes. The reaction mixture was then cooled and stirred with 200 cc. of diethyl ether. The resulting suspension was chilled for several hours at 0° C. The polymethine compound was collected on a filter and washed with alcohol. After two recrystallizations from methyl alcohol, the compound was obtained, in 45% yield, as dark green crystals melting at 262° to 263° C., with decomposition. The compound sensitized a gelatino-silver-bromiodide emulsion only slightly out to about 600 mu.

*Example 9—2-[4-(α-naphthothiazolylamino)-1,3-butadienyl]-benzothiazole ethiodide*

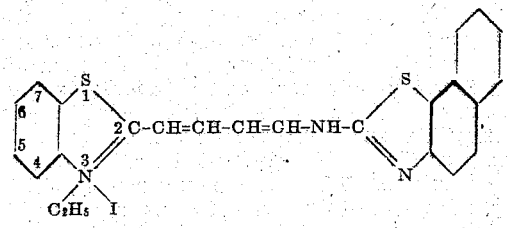

0.93 g. (1 mol.) of 2-(4-acetanilido-1,3-butadienyl)-benzothiazole ethiodide and 1.2 g. (3 mol.) of 2-amino-α-naphthothiazole were mixed together in 10 cc. of absolute ethyl alcohol. The resulting mixture was boiled, under reflux, for 2¾ hours. The cooled reaction mixture was then stirred with 100 cc. of diethyl ether. The resulting suspension was chilled for several hours at 0° C. The polymethine compound was collected on a filter and then stirred with hot acetone. The acetone suspension was chilled for several hours at 0° C. The polymethine compound was again filtered off and washed with acetone. After two recrystallizations from methyl alcohol, the compound was obtained, in 19% yield, as green crystals melting at 234° to 235° C., with decomposition. The compound sensitized a photographic gelatino-silver-bromiodide emulsion fairly strongly out to about 670 mu with maxima at 540 mu and at 620 mu.

*Example 10—2-(4-anilino-1,3-butadienyl)-benzoxazole ethiodide*

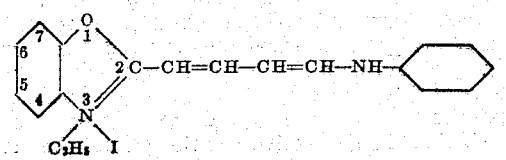

4.6 g. (1 mol.) of 2-(4-acetanilido-1,3-butadienyl)-benzoxazole ethiodide and 1.86 g. (2 mol.) of aniline were mixed together in 20 cc. of absolute ethyl alcohol. The resulting mixture was boiled, under reflux, for 20 minutes. The reaction mixture was then stirred with 200 cc. of ether, and the resulting suspension was chilled for several hours at 0° C. The polymethine compound was filtered off and stirred with boiling acetone. The acetone suspension was chilled for several hours at 0° C. The polymethine compound was again filtered off and washed with acetone. After three recrystallizations, two from ethyl alcohol and a third from acetone, the compound was obtained, in 3% yield, as reddish needles having a blue reflex and melting at 188° to 190° C., with decomposition. The compound sensitized a photographic gelatino-silver-bromiodide emulsion fairly strongly out to about 550 mu with a maximum at about 515 mu.

In a similar manner 2-(4-anilino-1,3-butadienyl)-α-naphthoxazole ethiodide was obtained, in 25% yield, after three recrystallizations from 95% ethyl alcohol as light reddish crystals melting at 163° to 165° C., with decomposition. This compound sensitized a photographic gelatino-silver-bromiodide emulsion strongly out to 580 mu with a maximum at about 530 mu.

*Example 11—2-(4-anilino-1,3-butadienyl)-benzoselenezole ethiodide*

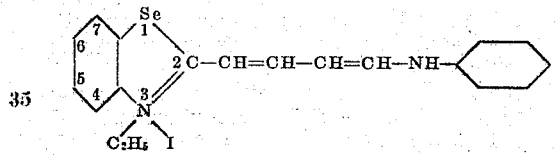

1.3 g. (1 mol.) of 2-(4-acetanilido-1,3-butadienyl)-benzoselenezole ethiodide and 0.3 g. (1.25 mol.) of aniline were mixed together in 15 cc. of absolute ethyl alcohol. The resulting mixture was boiled, under reflux, for 20 minutes. The reaction mixture was then cooled and stirred with 200 cc. of diethyl ether. The resulting suspension was chilled for several hours at 0° C. The polymethine compound was then filtered off and stirred with boiling acetone. The resulting suspension was chilled for several hours at 0° C., and the polymethine compound was again filtered off and washed with acetone. After two recrystallizations from methyl alcohol, the compound was obtained, in 71% yield, as dark needles having a green reflex and melting at 225° to 226° C., with decomposition. The compound sensitized a photographic gelatino-silver-bromiodide emulsion fairly strongly out to 620 mu with a maximum at about 560 mu.

In a similar manner 2-(4-anilino-1,3-butadienyl)-β-naphthothiazole ethiodide was obtained after two recrystallizations from methyl alcohol, in 25% yield, as dark needles having a double blue and green reflex and melting at 232° to 233° C., with decomposition. The compound sensitized a photographic gelatino-silver-bromiodide emulsion weakly out to about 620 mu with no well-defined maximum.

*Example 12—2-(6-anilino-1,3,5-hexatrienyl)-benzothiazole ethiodide*

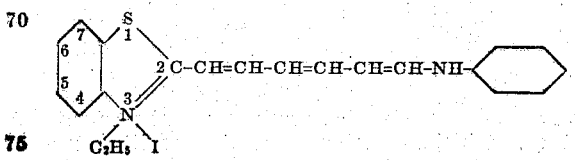

1.25 g. (1 mol.) of 2-(6-acetanilido-1,3,5-hexatrienyl)-benzothiazole ethiodide and 0.3 g. (1.25 mol.) of aniline were mixed together in 10 cc. of absolute ethyl alcohol. The resulting mixture was boiled, under reflux, for 20 minutes. The reaction mixture was then cooled and stirred with 200 cc. of diethyl ether. The resulting suspension was chilled at 0° C., for several hours. The polymethine compound was filtered off and stirred with boiling acetone. The resulting suspension was chilled for several hours at 0° C. The polymethine compound was again filtered off and washed with acetone. After two recrystallizations from methyl alcohol, the compound was obtained, in 26% yield, as minute green needles melting at 161° to 163° C., with decomposition. The compound sensitized a gelatino-silverbromiodide emulsion weakly from about 580 mu to about 690 mu with a maximum at 660 mu.

In a manner similar to that illustrated in Example 1, 2-(2-anilinovinyl)benzothiazole pheniodide can be prepared from 2-(2-acetanilidovinyl) benzothiazole pheniodide. This acetanilido compound can be prepared as described in the copending application of L. G. S. Brooker and W. W. Williams, Serial No. 353,500, filed August 21, 1940, by condensing 2-methylbenzothiazole pheniodide with diphenylformamidine, in the presence of acetic anhydride. 2-methylbenzothiazole pheniodide can be prepared as also described in the aforesaid Brooker and Williams application, by hydrolyzing 2-dicarbethoxymethylene-3-phenylbenzothiazoline, in the presence of hydrochloric acid.

Those of my new polymethine compounds containing phenylamino-1,3-butadienyl and phenylamino-1,3,5-hexatrienyl groups in which the phenyl nucleus carries a halogen atom or an alkyl or alkoxy group, are, in general, fairly strong sensitizers of photographic emulsions. In fact, in some cases, the compounds can be said to be strong sensitizers. The same is true of those of my polymethine compounds containing a β-naphthylamino-1,3-butadienyl group or a β-naphthylamino-1,3,5-hexatrienyl group.

I have also found that the anilino group of cyclammonium quaternary salts containing, in a reactive position, a member selected from the group consisting of anilinovinyl groups, anilino-1,3-butadienyl groups and anilino-1,3,5-hexatrienyl groups, can be replaced by certain other amino groups by treating the cyclammonium quaternary salts with certain strong basic amines such as N,N-dialkyl-p-phenylenediamines and piperidine. The following example illustrates the replacement:

*Example 13—2-[4-(p-diethylaminoanilino)-1,3-butadienyl]-benzothiazole ethiodide*

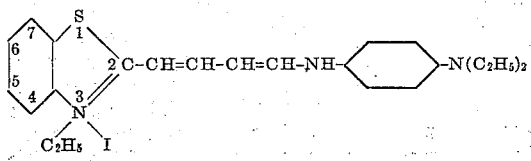

2.17 g. (1 mol.) of 2-(4-anilino-1,3-butadienyl)-benzothiazole ethiodide and 4.9 g. (6 mol.) of p-aminodiethylaniline were mixed together in 20 cc. of absolute ethyl alcohol. The mixture was boiled, under reflux, for 12 minutes. The blue reaction mixture was cooled and stirred with 200 cc. of diethyl ether. The resulting mixture was chilled at 0° C. The ethyl-alcohol layer was then decanted. The residue was stirred with 15 cc. of boiling acetone, and the resulting suspension was chilled at 0° C. The polymethine compound was collected on a filter and washed with acetone. After two recrystallizations from absolute ethyl alcohol, the compound was obtained, in 37% yield, as dark blue crystals melting at 224° to 225° C., with decomposition. The compound sensitized a photographic gelatino-silver-bromiodide emulsion weakly to about 710 mu with no well defined maximum.

In the preparation of photographic emulsions containing the herein described polymethine compounds, it is only necessary to disperse the compounds in the emulsions. It is convenient to add the compounds from solutions in appropriate solvents. Methanol has proven satisfactory as a solvent for the compounds.

Sensitization by means of these compounds is, of course, primarily directed to the ordinarily employed gelatino-silver-halide developing-out emulsions. The compounds are advantageously incorporated in the washed, finished emulsions and should, of course, be uniformly distributed throughout the emulsions.

The concentration of these compounds in the emulsion can vary widely, i. e., from about 5 to about 100 mg. per liter of flowable emulsions. The concentration of the compound will vary according to the type of light-sensitive material in the emulsion and according to the effect desired. The suitable and most economical concentration for any given emulsion will be apparent to those skilled in the art upon making the ordinary tests and observations customarily used in the art of emulsion making.

To prepare a gelatino-silver-halide emulsion sensitized with one of these compounds, the following procedure is satisfactory. A quantity of the compound is dissolved in methyl alcohol or other suitable solvent, and a volume of this solution (which may be diluted with water) containing from 5 to 100 mg. of compound is slowly added to about 1,000 cc. of gelatino-silver-halide emulsion with stirring. Stirring is continued until the compound is uniformly distributed throughout the emulsion. With most of my new sensitizing compounds, 10 to 20 mg. of compound per liter of emulsion suffices to produce the maximum sensitizing effect with the ordinary gelatino-silver-bromiodide emulsions.

The above statements are only illustrative and are not to be understood as limiting my invention, as it will be apparent that these compounds can be incorporated by other methods in any of the photographic silver-halide emulsions customarily employed in the art. For instance: the compounds may be incorporated by bathing a plate or film upon which an emulsion has been coated in a solution of the compound in an appropriate solvent. Bathing methods, however, are not to be preferred ordinarily.

What I claim as my invention and desire to be secured by Letters Patent of the United States is:

1. A process for preparing polymethine compounds comprising reacting a primary aromatic monoamine with a cyclammonium quaternary salt of the type used in cyanine dyes containing, in a reactive position, a member selected from the group consisting of N-acyl β-arylaminovinyl groups, N-acyl arylamino-1,3-butadienyl groups and N-acyl arylamino-1,3,5-hexatrienyl groups.

2. A process for preparing polymethine compounds comprising reacting a primary monoamine of the benzene series with a cyclammonium quaternary salt of the type used in cyanine dyes containing, in a reactive position, a member selected from the group consisting of N-acyl β-arylaminovinyl groups, N-acyl arylamino-1,3-butadienyl groups and N-acyl arylamino-1,3,5-hexatrienyl compounds.

3. A process for preparing polymethine compounds comprising reacting a primary aromatic monoamine of the naphthalene series with a cyclammonium quaternary salt of the type used in cyanine dyes containing, in a reactive position, a member selected from the group consisting of N-acyl β-arylaminovinyl groups, N-acyl arylamino-1,3-butadienyl groups and N-acyl arylamino-1,3,5-hexatrienyl groups.

4. A process for preparing polymethine compounds comprising reacting a primary monoamine of the benzene series with a cyclammonium quaternary salt of the type used in cyanine dyes containing, in a reactive position, a N-acyl β-arylamino vinyl group.

5. A process for preparing polymethine compounds comprising reacting a primary monoamine of the benzene series with a cyclammonium quaternary salt of the type used in cyanine dyes containing, in a reactive position, a N-acetyl β-arylamino vinyl group.

6. A process for preparing polymethine compounds comprising reacting a primary monoamine of the benzene series with a cyclammonium quaternary salt of the type used in cyanine dyes containing, in a reactive position, a N-acetyl β-anilinovinyl group.

7. A process for preparing polymethine compounds comprising reacting a primary monoamine of the naphthalene series with a cyclammonium quaternary salt of the type used in cyanine dyes containing, in a reactive position, a N-acyl β-arylaminovinyl group.

8. A process for preparing polymethine compounds comprising reacting a primary monoamine of the naphthalene series with a cyclammonium quaternary salt of the type used in cyanine dyes containing, in a reactive position, a N-acetyl β-arylaminovinyl group.

9. A process for preparing polymethine compounds comprising reacting a primary monoamine of the naphthalene series with a cyclammonium quaternary salt of the type used in cyanine dyes containing, in a reactive position, a N-acetyl β-anilinovinyl group.

FRANK L. WHITE.